US012698766B2

(12) United States Patent
Oppel

(10) Patent No.: US 12,698,766 B2
(45) Date of Patent: Aug. 4, 2026

(54) METHOD FOR CONTROLLING A COMPRESSOR INSTALLATION

(71) Applicant: Kaeser Kompressoren SE, Coburg (DE)

(72) Inventor: Thomas Oppel, Weitramsdorf (DE)

(73) Assignee: Kaeser Kompressoren SE, Coburg (DE)

( * ) Notice: Subject to any disclaimer, the term of this patent is extended or adjusted under 35 U.S.C. 154(b) by 446 days.

(21) Appl. No.: 17/516,114

(22) Filed: Nov. 1, 2021

(65) Prior Publication Data

US 2022/0049693 A1     Feb. 17, 2022

Related U.S. Application Data

(60) Continuation of application No. 15/435,530, filed on Feb. 17, 2017, now Pat. No. 11,162,492, which is a
(Continued)

(30) Foreign Application Priority Data

Dec. 23, 2008     (DE) ...................... 10 2008 064 490.0

(51) Int. Cl.
*F04B 49/08*          (2006.01)
*F04B 49/00*          (2006.01)
(Continued)

(52) U.S. Cl.
CPC ............ *F04B 49/08* (2013.01); *F04B 49/007* (2013.01); *F04B 49/065* (2013.01); *F04C 28/02* (2013.01);
(Continued)

(58) Field of Classification Search
CPC ...... F04B 41/06; F04B 49/007; F04B 49/022; F04B 49/08; F04B 49/06; F04B 49/065;
(Continued)

(56) References Cited

U.S. PATENT DOCUMENTS 4,502,842 A     3/1985 Currier et al.
4,580,947 A     4/1986 Shibata et al.
(Continued)

FOREIGN PATENT DOCUMENTS

CN          1291684          4/2001
CN       101144470          3/2008
(Continued)

OTHER PUBLICATIONS

Chinese Patent Application No. 200980152463.7, Fourth Office Action dated Nov. 14, 2014, 4 pages.
(Continued)

*Primary Examiner* — Wesley G Harris
*Assistant Examiner* — Charles W Nichols
(74) *Attorney, Agent, or Firm* — Morgan, Lewis & Bockius LLP

(57)          ABSTRACT

A method for controlling a compressor system comprising a plurality of compressors, wherein the compressor system is intended to maintain a predefined excess pressure in a pressurized fluid system, wherein decisions are met at fixed or variable intervals as to switching operations for adapting the system to current conditions, wherein—in a pre-selecting step, switching alternatives are excluded from the plurality of combinatorially available switching alternatives, —in a main selecting step, remaining switching alternatives are weighed against one another while referring to one or more optimization criterion (criteria) and optimum switching alternatives are selected from among the given criteria, and—in a control step, the selected switching alternative is output for implementation in the compressor system.

19 Claims, 2 Drawing Sheets

Figures 1, 2:
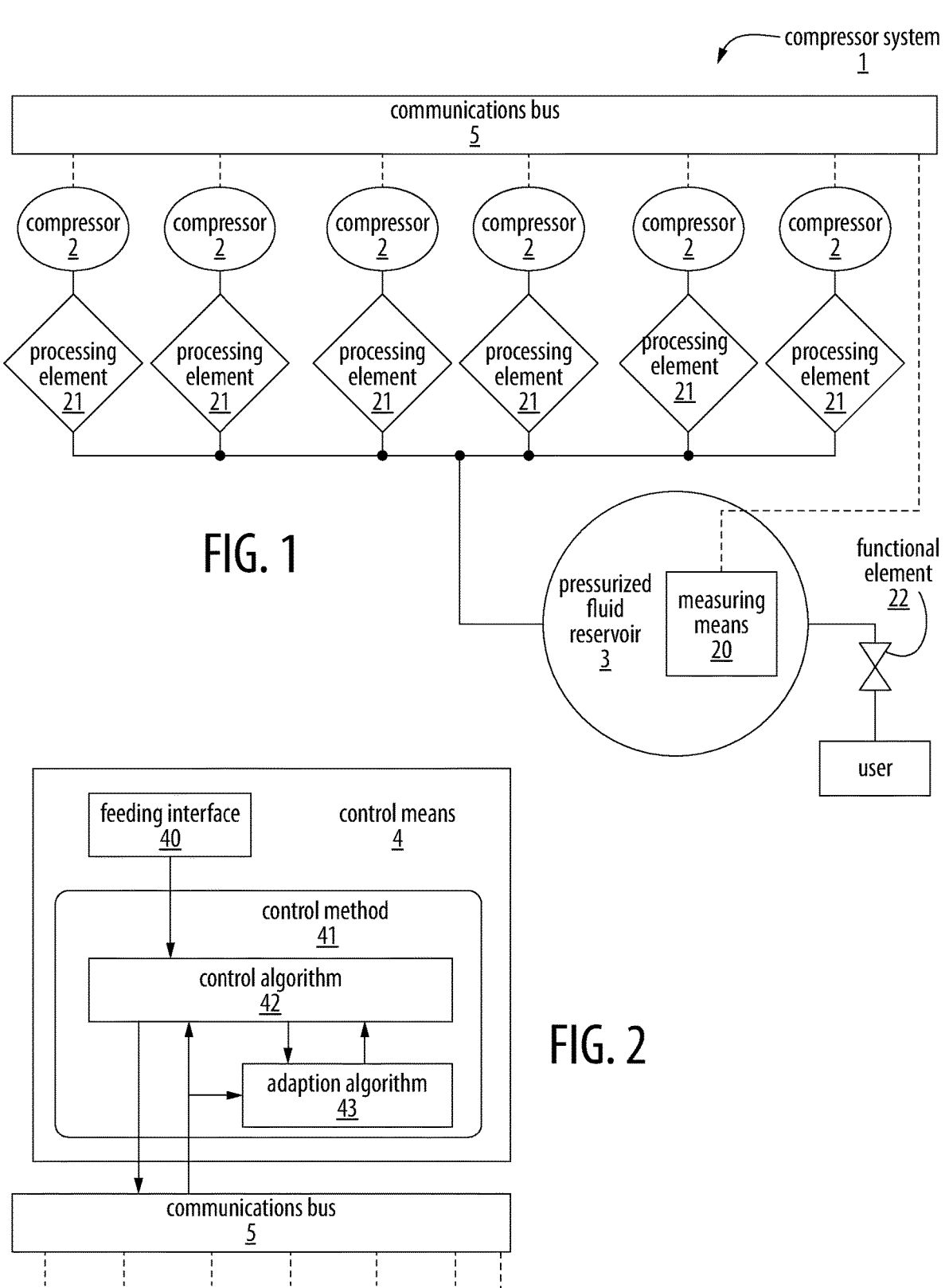

Related U.S. Application Data division of application No. 13/141,244, filed as application No. PCT/EP2009/067851 on Dec. 23, 2009, now abandoned.

(51) Int. Cl.

| | | |
|---|---|---|
| *F04B 49/06* | (2006.01) | |
| *F04C 28/02* | (2006.01) | |
| *F04C 28/24* | (2006.01) | |
| *F04D 27/00* | (2006.01) | |
| *G05D 7/06* | (2006.01) | |
| *F04C 23/00* | (2006.01) | |

(52) U.S. Cl.
CPC ............ *F04C 28/24* (2013.01); *F04D 27/005* (2013.01); *G05D 7/0629* (2013.01); *F04C 23/001* (2013.01); *F04C 2270/185* (2013.01); *F04C 2270/56* (2013.01)

(58) Field of Classification Search
CPC .............. F04B 2205/06; F04B 2205/07; F04B 2207/042; F04B 2207/0421; F04B 2207/0422; F04D 13/12; F04D 15/029; F04D 15/0209; F04D 25/16; F04D 23/001; F04D 23/005; F04D 23/006; F04D 14/02; F04D 14/06; F04D 14/065; F04D 27/005; F04D 28/02; F04D 28/06; F04D 28/065; F04C 11/001; F04C 11/003; F04C 11/005; F04C 11/006; F04C 28/02; F04C 28/24; F04C 2270/18; F04C 2270/185; F04C 2270/56; F04C 23/001; G05D 7/0629
See application file for complete search history.

(56) References Cited

U.S. PATENT DOCUMENTS

| | | | |
|---|---|---|---|
| 5,108,263 A | 4/1992 | Blotenberg | |
| 5,343,384 A | 8/1994 | Fisher et al. | |
| 5,713,724 A * | 2/1998 | Centers .............. | G05B 23/0286 |
| | | | 417/279 |
| 5,967,761 A | 10/1999 | Mehaffey | |
| 6,233,954 B1 * | 5/2001 | Mehaffey .............. | F25B 49/022 |
| | | | 417/4 |
| 6,287,083 B1 | 9/2001 | Hase et al. | |
| 6,419,454 B1 | 7/2002 | Christiansen | |
| 6,499,504 B2 | 12/2002 | Wichert | |
| 6,599,094 B2 | 7/2003 | Kanazaki et al. | |
| 7,263,413 B1 | 8/2007 | Hofmann | |
| 7,344,201 B1 | 3/2008 | Bates | |
| 8,073,654 B2 | 12/2011 | Drouart et al. | |
| 2003/0065423 A1 | 4/2003 | Vanderbeek | |
| 2003/0161731 A1 | 8/2003 | Blotenberg | |
| 2006/0257265 A1 | 11/2006 | Pettersson | |
| 2007/0077151 A1 | 4/2007 | Hirasawa et al. | |
| 2007/0157650 A1 * | 7/2007 | Takegami ............. | F25B 49/025 |
| | | | 62/230 |
| 2008/0063534 A1 | 3/2008 | Nakayama et al. | |
| 2008/0131258 A1 * | 6/2008 | Liepold .............. | F04D 27/0269 |
| | | | 700/282 |
| 2012/0029706 A1 | 2/2012 | Wagner | |

FOREIGN PATENT DOCUMENTS

| | | |
|---|---|---|
| DE | 3332619 | 3/1985 |
| DE | 3500636 | 7/1985 |
| DE | 19826169 | 12/1999 |
| DE | 10208676 | 9/2003 |
| EP | 0431287 | 6/1991 |
| EP | 1344935 A2 | 9/2003 |
| EP | 1672454 | 6/2006 |
| EP | 1906024 | 2/2008 |
| JP | 2005-290989 | 10/2005 |
| WO | 03095841 | 11/2003 |
| WO | 2010072803 | 7/2010 |
| WO | 2010072808 | 7/2010 |

OTHER PUBLICATIONS

Japanese Patent Application No. 2011-542827, Preliminary Reasons for Rejection, dated Oct. 6, 2014, 4 pages.
Australian Patent Application No. 2009331503, Patent Examination Report No. 2, dated Jan. 8, 2015, 5 pages.
Chinese Patent Application No. 200980152463.7, Notification of the First Office Action, dated Jul. 2, 2013, 15 pages.
English Translation of International Search Report from corresponding International Application No. PCT/EP2009/067838.
English Translation of Office Action from corresponding German Application No. 10-2008-064-491.9.
English Translation of International Search Report from PCT/EP/2009/067851.
English Translation of Office Action form German Application No. 10-2008-064-490.0.
English Translation of DE 3332619.
European Patent Application No. 12198935, European Search Report and Written Opinion, dated Oct. 20, 2017, 8 ;ages.
Notice of Opposition to a European Patent for European Patent EP 2573400, dated Jul. 26, 2022.

* cited by examiner

METHOD FOR CONTROLLING A COMPRESSOR INSTALLATION

CROSS-REFERENCE TO RELATED APPLICATIONS

The present application is a continuation of U.S. patent application Ser. No. 15/435,530 filed Feb. 17, 2017, which is a divisional of U.S. patent application Ser. No. 13/141, 244, filed Aug. 12, 2011, which is a U.S. national stage of International Patent Application No. PCT/EP2009/067851, filed Dec. 23, 2009 which claims priority to German Patent Application No. 102008064490.0, filed Dec. 23, 2008. The entire contents of each application are incorporated herein by reference in their entireties.

The invention relates to a method for controlling a compressor system comprising a plurality of compressors, optionally of different design and/or performance. Concurrently, the invention relates to a control means for such a compressor system as well as a data record for the control of such a compressor system.

For the supply of sufficient pressurized fluid, compressor systems, optionally compressor systems provided for industrial applications, typically require a large number of individual compressors for supplying this pressurized fluid. In order to operate such a compressor system efficiently, the cost effectiveness of the individual components as well as the entire compressor system is not only increasingly taken into account during the design and planning of the compressor system but also during the operation thereof. These aspects as to the cost effectiveness of the compressor system are typically taken into account besides environmental regulations and quality requirements which have to be met also. The energy consumption of a compressor system can in this connection amount up to 80% of the total running costs, a reason why the energy demand is the main cost factor for a compressor system operator.

To make use of the energy saving potentials of a compressor system, it was found that apart from measures as to heat recovery or the reducing of leakages for instance, the use of appropriate controlling and regulating systems allows for a significant reduction of the operating costs of a compressor system. A control or regulation of the compressor system, for instance, enables various compressors to be suitably divided up and consequently reduces the risk of failure respectively facilitates maintenance of the compressor system. In case of a compressor failing, for example, other compressors which are at no-load or stopped can be addressed by the control or regulation and caused to provide pressurized fluid so as to prevent the operational pressure of the compressor system from dropping or the stopped status thereof.

In the simplest case, cascade or pressure band regulations are used for controlling compressor systems including a plurality of compressors which decide which compressor of the compressor system is in each case switched on or off at predefined operating conditions. In the cascade regulation, each compressor is assigned a determined pressure range according to which the switching on or off of a respective compressor is determined by the control. Thanks to this definition of individual pressure ranges, also called pressure bands, which are assigned to the compressors, the demanded amount of pressurized fluid can be covered even at high withdrawal rates of pressurized fluid by switching on a larger number of compressors respectively by switching on compressors having an increased delivery amount as compared to the others. A disadvantage in such regulations, however, is that the current consumption of pressurized fluid or the change of the current withdrawal of pressurized fluid typically is not taken into account.

Improved pressure band controls make use of the possibility to control any desired number of compressors via a single pressure band. Such a method of controlling can achieve the reduction of the maximum pressure of pressurized fluid prevailing in the compressor system, on the one hand, and simultaneously also decrease some energetic losses in the compressor system, on the other.

Yet, it has shown that pressure band regulation at a typical graduation of individual compressors relative to each other at a fluctuating withdrawal of pressurized fluid from the compressor system are not suited to control a compressor system such that the demand for pressurized fluid can be covered sufficiently, on the one hand, and, on the other, in an energetically efficient manner. For example, operational states or constellations can arise in the compressor system which either lead to an insufficient supply of pressurized fluid or to an energetically extremely inefficient supply of pressurized fluid. According to these disadvantages known from prior art, hence the task is to propose an improved method for controlling a compressor system which enables a sufficient supply of pressurized fluid even at fluctuating withdrawal of pressurized fluid from the compressor system, wherein concurrently the switching operations caused by the control should be as economic as possible.

According to the invention, this task is solved by a method for controlling a compressor system which comprises a plurality of compressors.

The task on which the invention is based is optionally solved by a method for controlling a compressor system which comprises a plurality of compressors, optionally of different design and/or performance, wherein the compressor system is intended to maintain a predefined overpressure in a pressurized fluid system despite a possibly even fluctuating withdrawal of pressurized fluid from the pressurized fluid system, wherein decisions are met at fixed or variable intervals as to switching operations for adapting the system to current conditions, wherein in a pre-selecting step, preferably in consideration of the current conditions, switching alternatives are excluded from the multitude of combinatorially available switching alternatives, wherein in a main selecting step remaining switching alternatives are weighed up against one another while referring to one optimization criterion or more optimization criteria, and optimum switching alternatives are selected among the given criteria, and wherein in a control step, the selected switching alternative is output for implementation in the compressor system.

The task is moreover solved by a method for controlling a compressor system which comprises a plurality of compressors, optionally of different design and/or performance, wherein the compressor system is intended to maintain a predefined overpressure in a pressurized fluid system despite a possibly even fluctuating withdrawal of pressurized fluid from the pressurized fluid system, wherein the control of the system takes measures for increasing the generation of compressed pressurized fluid upon reaching a possibly variable switch-on pressure, and for reducing the generation of compressed pressurized fluid upon reaching a switch-off pressure, wherein the switch-off pressure is variable and can be changed as a function of the current configuration of the compressor system and/or in consideration of a defined switching operation (a defined change of the compressor system configuration).

Here and in the following, the maintenance of a predefined overpressure shall be performed such that an adaptation pressure that can be reached by the real pressure process is not or only insignificantly and/or shortly undercut, and optionally an upper pressure limit is not or only insignificantly and/or shortly exceeded.

The inventive task is in addition solved by a controlling means for a compressor system which comprises a plurality of compressors, optionally of different design and/or performance, wherein the compressor system is intended to maintain a predefined overpressure in a pressurized fluid system despite a possibly even fluctuating withdrawal of pressurized fluid from the pressurized fluid system, wherein decisions are met at fixed or variable intervals as to switching operations for adapting the system to current conditions, and wherein the controlling means comprises: an excluding means which excludes, preferably in consideration of the current conditions, switching alternatives from a multitude of combinatorially available switching alternatives, a selecting means which weighs up remaining switching alternatives against one another while referring to on optimization criterion or more optimization criteria, and selects an optimum switching alternative among the given criteria, as well as an output means which is configured to output the selected switching alternative for implementation in the compressor system.

The task on which the invention is based is further solved by a controlling means for a compressor system which comprises a plurality of compressors, optionally of different design and/or performance, wherein the compressor system is intended to maintain a predefined overpressure in a pressurized fluid system despite a possibly even fluctuating withdrawal of pressurized fluid from the pressurized fluid system, and wherein the controlling means comprises: a switch-off pressure determining means which, upon overproduction of pressurized fluid, determines a switch-off pressure as a function of the current configuration of the compressor system and/or in consideration of a defined switching operation (a defined change of the compressor system configuration).

The inventive task is further solved by a data record which is preferably configured for transmission in a data network or stored on a data carrier, for controlling a compressor system, wherein the compressor system comprises a plurality of compressors, optionally of different design and/or performance, and wherein the compressor system is intended to maintain a predefined overpressure in a pressurized fluid system despite a possibly even fluctuating withdrawal of pressurized fluid from the pressurized fluid system, wherein decisions are met at fixed or variable intervals as to switching operations for adapting the system to current conditions, wherein in a pre-selecting step, preferably in consideration of the current conditions, switching alternatives are excluded from the multitude of combinatorially available switching alternatives, wherein in a main selecting step remaining switching alternatives are weighed up against one another while referring to one optimization criterion or more optimization criteria, and optimum switching alternatives are selected among the given criteria, and wherein in a control step, the selected switching alternative is output for implementation in the compressor system.

The inventive task is moreover solved by a data record which is preferably configured for transmission in a data network or stored on a data carrier, for controlling a compressor system, wherein the compressor system comprises a plurality of compressors, optionally of different design and/or performance, and wherein the compressor system is intended to maintain a predefined overpressure in a pressurized fluid system despite a possibly even fluctuating withdrawal of pressurized fluid from the pressurized fluid system, wherein the control of the system takes measures for increasing the generation of compressed pressurized fluid upon reaching a possibly variable switch-on pressure, and for reducing the generation of compressed pressurized fluid upon reaching a switch-off pressure, wherein the switch-off pressure is variable and can be changed as a function of the current configuration of the compressor system and/or in consideration of a defined switching operation (a defined change of the compressor system configuration).

Here and in the following, the term control shall also be understood in the meaning of a regulation. Since the method for controlling a compressor system as well as the individual embodiments of the method can exhibit both control-specific and regulation-specific features, a stringent discrimination of bother terms was presently relinquished in favor of an understandable legibility.

A core idea of the present invention is to take in each case into account a multitude of possible switching alternatives prior to implementing a switching operation for adapting the pressurized fluid system to current conditions, which switching alternatives are weighed up against one another while referring to one optimization criterion or more optimization criteria so as to be able to select a best possible switching alternative for implementation. In doing so, numerous possible switching alternatives can be excluded due to the use of a pre-selecting step prior to realizing the main selecting step, whereby subsequently only just a smaller number of possible switching alternatives has to be compared against each other. This separation of different selecting steps permits a relatively rapid selection of a best possible switching alternative which is subsequently output in a control step via a switching command for implementation in a compressor system.

As a consequence, switching operations can be performed in shorter and consecutive time intervals, whereby an improved adaptation of the pressurized fluid system to current conditions of the compressor system can be achieved. As a further consequence, the cost effectiveness of the compressor operation is increased. If an important withdrawal of pressurized fluid from the pressurized fluid system takes place, for example, it is possible for the compressor system control by performing the pre-selecting step to avoid unnecessarily complicated weightings by comparing a relatively large number of possible switching alternatives while referring to one or more optimization criteria, and to restrict the weighting to a smaller number of possible and suitable switching alternatives. Consequently, it is possible for the present control to respond in a very short time with a nonetheless suitable and best possible switching alternative to an important withdrawal of pressurized fluid from the pressurized fluid system.

A further core idea of the present invention is that the control of the compressor system takes measures upon reaching a switch-off pressure for reducing the generation of compressed pressurized fluid, wherein the switch-off pressure is variable. The present control accordingly differs from a typical pressure band control known from the prior art in which switching operations as a rule are triggered upon reaching fixed predefined pressure values. The variable design of the switch-off pressure allows for a suitable adaptation of an actuating operation to the current configuration of the compressor plan, respectively can also take into account defined actuating operations according to a defined change of the compressor system configuration.

Essential reasons for the inefficiency of use of a compressor system using a typical pressure band control can be that, on the one hand, a too large given pressure band temporarily leads to unnecessarily high pressures in the pressurized fluid system, whereby the compressors under load have to do unnecessary work. On the other hand, a too small given pressure band can lead to unnecessarily frequent switching operations which to a large extent can result in unnecessary work associated with these switching operations.

Hereinbefore and hereinafter, a switch-on pressure shall be understood as a virtual pressure value, upon reaching of which the control of the compressor system causes switching operations to be implemented which counteract dropping of the overpressure prevailing in the pressurized fluid system. The switch-on pressure hence is below the switch-off pressure which is likewise defined as a virtual pressure value, upon reaching of which switching operations are likewise caused in the compressor system at an increasing real pressure profile which result in compressors being switched off. Switching on as well as switching off compressors here can comprise not only switching on or off the entire compressor unit into load running or no-load running respectively stopped state but also a gradual changing of the output to higher or lower values.

In accordance with the switching alternative implemented in the compressor system, a changing profile of the prevailing pressure (overpressure) in the compressor system comes about. This pressure profile which constitutes a really measurable parameter exhibits local minimum and local maximum values during its time course which result from the withdrawing of pressurized fluid from the pressurized fluid system or the supplying of pressurized fluid by the respective compressors. Typical switching operations to be executed upon exceeding the switch-off pressure are the switching of a compressor or compressor group from load to no-load running or stopped status or else the reduction of the running power of load running compressors or compressor groups. Typical switching operations to be implemented in the compressor system upon falling below the switch-on pressure which is lower as compared to the switch-off pressure, are the switching of a compressor at stopped status or no-load running to load running or else the increasing of the running power of load running compressors or compressor groups in order to achieve the increased conveying of pressurized fluid.

Due to the technical structural characteristics of compressors, switching operations upon exceeding the switch-off pressure essentially are implemented immediately. Switching operations which are realized at an overpressure decreasing in the compressor system and falling below the switch-on pressure, however, typically are only implemented at a certain time delay (dead time), since a start-up of a compressor from stopped status or no-load running to the desired operating speed requires a technically necessary preliminary run. Accordingly, such pre-running times are shorter upon switching off a compressor as compared to a switching on of a compressor, the two switching operations, however, lead to an implementation of the induced switching operations which is typically staggered in time.

Accordingly, the virtual switch-off pressure in practice is identical to a local maximum value of the real pressure profile to be reached. It is true that exceptions are possible in case of very rapid reductions of the pressurized fluid demand and/or erroneous selection of too small compressors to be switched off load, but arise seldom in practice. In contrast to this, the virtual switch-on pressure as a rule is significantly above the virtual adaptation pressure to be reached to which the minimum value of the real pressure course should correspond, since although switching-on operations are caused to be implemented upon falling below the switch-on pressure, same can only start the full pressurized fluid supply staggered in time due to the compressors' immanent delay times A task of the present method for controlling a compressor system hence is to determine the switch-on pressure such that the minimum values of the real pressure profile reach the adaptation pressure as precisely as possible but do not fall below same. In other words, the adaptation pressure is a virtual pressure value which the minimum values of the real pressure profile should reach as precisely as possible. The adaptation value hence is a default value for a real pressure value not to be undercut, if possible, which in one possible embodiment can be variably assessed as a function of the current operating state of the compressor system.

To comply with the pressure resistance limits of the components within the pressurized fluid system it is typically also necessary for the real pressure profile to not exceed an upper pressure limit, if possible. Consequently, upon reaching the upper pressure limit at the latest appropriate switching operations are triggered in the compressor system, for example, the switching off of compressors under load, so that the real pressure profile does not exceed the upper pressure limit, if possible. In practice, the upper pressure limit usually can be set to be so high as to be above the switch-on pressures which are determined on a case-by-case basis due to criteria for minimizing the energy consumption, so that the switch-off pressures and the maximum values of the real pressure profile which largely correspond thereto, come about without influencing the upper pressure limit and hence within the pressure tolerance between adaptation pressure and upper pressure limit, preponderantly or exclusively from energetic aspects.

If the virtual switch-on pressure for individual switching operations is assessed on a case-by-case basis so that the real pressure profile reaches the adaptation pressure at a decreasing pressure profile as precisely as possible, this has positive effects on the energy consumption of the entire compressor system since an unnecessary increase of the pressure level due to the compressors being switched on too early is prevented and an unnecessary work performance does not occur.

It is to be noted at this point that the determining of the variable virtual switch-on pressure by the control of the compressor system takes place such that the minimum values of the real pressure profile reach the given adaptation pressure as precisely as possible but do not or only insignificantly and/or shortly fall beyond same. For this purpose, the switch-on pressure is determined such that a switch-on response time of a compressor or a compressor group to be switched to load follows a prognosticated pressure profile. The determining of the switch-on or switch-off pressure by the control of the compressor system can also ensue by a control of the compressor system on a time basis instead of a pressure basis, with the determining of the switch-on or switch-off pressure being replaced by appropriately determining a switch-on or switch-off time. A control based on a time basis hence is equivalent to the present control based on a pressure basis. The determining of a switch-on time, alike the determining of a switch-on pressure (the same applies to the switch-off time or switch-off pressure), is in each case executed case-by-case for future switching operations.

Furthermore, it is to be noted that the method provided for supplying a predefined overpressure in a pressurized fluid system can also be used analogously in a vacuum system in which a negative pressure not to be exceeded must be maintained which is made available to users. Switching on a pump comprised by a corresponding system consequently would entail a pressure drop of the pressurized fluid in the system, and switching off a pump or a pump group accordingly would entail an increase of the pressure in the pressurized fluid system in case of vacuum being withdrawn or vacuum deteriorating e.g. due to leakages. According to the skilled person's understanding, a transfer of the present method for controlling a system to maintain a predefined overpressure to a method for controlling a compressor or pump system in which a predefined negative pressure should not be exceeded, can be realized analogously.

One preferred embodiment of the method for controlling a compressor system provides for the control of the system, upon reaching a possibly variable switch-on pressure, to take measures for increasing the generation of compressed pressurized fluid and, upon reaching a possibly variable switch-off pressure, measures for reducing the generation of compressed pressurized fluid.

A further preferred embodiment of the method for controlling a compressor system provides for the switch-off pressure to be assessed, optionally calculated, in an energy optimization on a case-by-case basis. Accordingly, the compressor systems are primarily controlled with the objective of optimizing, i.e. minimizing the energy demand, wherein a predefined overpressure is concurrently maintained, i.e. preferably not or only insignificantly and/or shortly undercut. Optimizing respectively minimizing should be understood hereinafter merely as an optimizing respectively minimizing within the scope of the possible switching alternatives. Due to this energy demand minimizing, the present method differs significantly from conventional pressure band control methods which control the pressure in the pressurized fluid system as the most important control parameter rather than the energy demand of the compressor system. A targeted energy saving can be realized due to the exploitation of the technical degrees of freedom which are made available by selecting a suitable switching alternative from a multitude of different switching alternatives. Optionally the variable switch-on pressure can be determined in this case such that, upon the real pressure profile falling below the switch-on pressure, the virtual adaptation pressure corresponds in the reversal point of the real pressure profile as precisely as possible to the minimum values of the real pressure. Such an optimization, on the one hand, allows the wanted pressure level to be maintained, and, on the other, the number of necessary switching operation to be kept low, which results in a very cost-effective operation.

In a further embodiment of the method according to the invention, the optimum switch-off pressure is determined by computationally minimizing the quotient from the total work loss in a predefined periodic time interval concerning one switching alternative, and the time interval itself. In this case, the total work loss comprises the sum of work loss of all load running compressors in said time interval, the no-load running work loss of all of the compressors to be switched on in the said time interval, and the switching work loss of all of the compressors to be switched on and off in said time interval. The periodic time interval is in this case based on the observation of so-called switching cycles. Such (virtual) switching cycles are time-pressure-profiles which similarly (periodically) repeat within the time interval (switching cycle duration) rising form a minimum to a maximum and falling again to a minimum pressure value which would arise at a temporarily essentially constant withdrawal of pressurized fluid, i.e. at least for the switching cycle duration. For a simplifying calculation it may be assumed that the withdrawal of pressurized fluid from the pressurized fluid system takes place such that the real pressure profile between the minimum and maximum pressure value can be assumed in each case to be linear or approximated by straight lines. The compressor(s) to be switched to load upon reaching the switch-on pressure, respectively off load upon reaching the switch-off pressure is/are presupposed to be known and can also be selected beforehand by means of appropriate heuristics. It is moreover also typically assumed that the operating states of the remaining compressors are only influenced by the pressure profile of the real pressure and otherwise remain unchanged.

A switching cycle concerns a period length of the real, likewise periodic pressure profile. The simplifying assumptions being presupposed, the mean energy demand of all of the compressors comprised by the compressor system during one switching cycle, i.e. during the previously described periodic time interval, can be minimized in one closed mathematical expression. In doing so, however, the observation of the total mean energy demand of all compressors is not required, rather can an appropriately defined total power loss $P_V$ be assumed as a simplification which is treated substitutionally. In the simplest case, this power loss can be calculated from the previously described total work loss as well as the length of the periodic time interval of one switching cycle as a quotient. The thus defined total power loss is a temporally averaged power loss within one switching cycle. As will be explained in more detail below, a simple mathematical manipulation allows for an optimized switching cycle pressure difference to be calculated which can be derived from parameters which are simple to determine. The switching cycle difference is defined by the difference between the switch-off pressure and adaptation pressure.

Tests have shown that control or regulating methods which refer to an optimization of the switching cycle pressure difference as an optimizing criterion, have achieved considerable successes in reducing the energy consumption of the compressor system.

A further development of the method of the invention can moreover provide for the following parameters to enter into the calculating of the switch-off pressure: the energy demand of the load running compressors, optionally with a conveying against a continuously increasing pressure and/or no-load running losses of the compressors to be switched to no-load running or stopped status and/or no-load running losses of the no-load running compressors and/or switching loss energy of the compressors to be switched per switching alternative. In doing so, the parameters concerned can be established according to known heuristics or else be determined in appropriate tests respectively by means of appropriate calculating methods. They can optionally also include the temporal behavior of the individual compressors in the form of time charts for all load, no-load or switching states in a quantitative form, wherein the time delay between one switching time and the complete implementation of a switching operation can also be explicitly taken into account. The delay times therefore can also enter into the determining of an appropriate switch-on or switch-off pressure as a calculating parameter.

In accordance with the embodiment it is also possible for the switch-on pressure to be calculated in the method for controlling a compressor system such that the real pressure profile reaches as precisely as possible a calculated adaptation pressure, which is below the switch-on pressure, preferably at a deviation of less than 5%, further preferred less than 2%, and further preferred does not or only insignificantly and/or shortly fall below same. Correspondingly, the maintenance of a predefined overpressure can be ensured in the compressor system, wherein a cost-effective and efficient control of the compressor system takes place concurrently.

A further embodiment of the method according to the invention provides for the switching alternatives for the reducing of the generation of pressurized fluid to be evaluated according to optimizing criteria other than switching alternatives for the increasing of the generation of pressurized fluid. A further differentiated adaptation of the method of the invention can accordingly take place, whereby it can be reached, for example, that the real pressure profile in its reversal points, i.e. its minimum and maximum pressure values, reaches as precisely as possible the predefined adaptation pressure and the switch-off pressure which is calculated or determined on a case-by-case basis according to criteria of energy consumption optimization during one switching cycle duration.

In a further developed embodiment of the method according to the invention for controlling a compressor system, decisions are met as to the weighting and selecting of switching alternatives for the reducing of the generation of pressurized fluid among optimizing criteria which primarily or exclusively take into account the respective total energy expenditure of the different switching alternatives under consideration.

In a further developed embodiment, the taking into account of the total energy expenditure of different switching alternatives includes at least: the energy demand of the load running compressors and/or no-load running losses of the compressors to be switched in idle running or at stopped status and/or no-load running losses of the idle running compressors and/or switching loss energy of the compressors to be switched per switching alternative. Since the total energy expenditure is calculated in an optimized manner on a case-by-case basis over all time periods of the utilization of the compressor system and enters directly into the selection of an appropriate switching alternative, a particularly energy-efficient control of the compressor system is achieved.

In accordance with the embodiment, the evaluating and selecting of the switching alternative can take place in real-time. Here and hereinafter real-time will be understood as a time dimension which is considerably shorter than the time sequence of two switching alternatives to be implemented. Accordingly, the evaluating and selecting of the switching alternative takes place at a sufficient speed so as to be able to also take into account unexpected important changes of the pressurized fluid provided in the pressurized fluid system. In other words, the delay caused by the evaluating and selecting of the switching alternative is not required to be explicitly taken into account in the control method.

In another embodiment of the method according to the invention, the determining of the switch-off and/or switch-on pressure is performed in real-time. Accordingly, an immediate adaptation of the control to the changing operating states in the pressurized fluid system can be performed at a sufficient speed without fundamentally new operating states arising during the time required for the determining of the switch-off and/or switch-on pressure which would necessitate the selecting of another switching alternative.

In a further preferred embodiment of the method according to the invention, the control of the system is performed in consideration of experiential parameters from past switching operations (adaptive control). The control can optionally determine the switch-on pressure such that the production start of a compressor switched to load is performed sufficiently early so as to make the pressure reversal of the real pressure profile happen as close as possible to the adaptation pressure. In doing so, the control method can adaptively learn a switch-on response time for each compressor which has to be understood as a time span between the transmission of a switch-on command for implementing a switching alternative and the actual start of the effect on the real pressure profile. The switch-on pressure can be selected such that the switch-on response time equals the time span in which the real pressure profile is expected to drop from the switch-on pressure to the adaptation pressure. This time span can be estimated by a prognosis of the further pressure profile based on suitable assumptions, for example, based on the assumption of a linearly dropping pressure profile.

An adaptive learning of the switch-on response time for each compressor can be performed inter alia by evaluating the real pressure profiles over a number of selected periodic time intervals of the real pressure profile of one compressor or a group of compressors. The adaptively learnt switch-on response times can be further updated, even continuously, by appropriately forming new values, e.g. moving average values.

In doing so, the adaptive learning behavior of the control supports decisively the target to optimize the energy demand of the compressor system. The adaptive behavior is in this case typically based on underlying learning algorithms and adaptive parameters, which parameters are readjusted by the control in the course of the control method, and are available from the control in an updated manner for any further evaluation and selection of a switching alternative. Consequently, the adaptive learning behavior permits the control to automatically adapt to any regulation-technologically relevant characteristics and conditions of the compressor system during running operation. Since application-technologically relevant parameters can be also collected and evaluated (level of energy demand), the control flexibly adapts to the behavior of the compressor system in the operating state in terms of an energetic optimization.

The underlying learning algorithms can calculate the designated adaptive parameters either by evaluating a measurement value which was traced over a longer period of time or by evaluating a suitable number of single events. Both approaches are suited to readjust the adaptive parameters during the running operation of the compressor system while keeping short-term influences or singular influences out of the calculating of the adaptive parameters.

The adaptive behavior of the control permits to get along with only relatively few control parameters, wherein the control behavior of the control is not required to be manually optimized or re-optimized and even with expansions or constructional alterations of the compressor system any further adaptations are not required to be done. The essential parameter is in this case typically the adaptation pressure, whereas the switch-off pressure or the switching cycle pressure difference will result from the switch-off pressure and adaptation pressure based on criteria with respect to minimizing the energy demand. Accordingly, the operating-technological and maintenance-technological expenditure for the startup and maintenance of the control is minimal.

In a further developed embodiment of the method according to the invention, the experiential parameters comprise the level of energy demand (energy demand per fluid quantity) of individual compressors or certain combinations of compressors and/or switch-on response time of the compressors and/or consumption behavior of the pressurized fluid consumers and/or the size of the pressure accumulator and/or the pressure compensation of the compressors or certain combinations of compressors.

The level of energy demand describes the energy utilization of single compressors or combinations of compressors in the running operation as an adaptive parameter and is represented as a ratio of energy demand and the fluid amount conveyed through the involved compressors. In this case, the energy demand as well as the conveyed fluid amount are calculated over an appropriately selected period of time by numerically integrating the power consumption or conveyed amount which have been made accessible on a computational and/or metrological way. Since the computing of the level of energy demand describes all of the actually performed works (load work, no-load running, work loss, switching work loss) as well as the actually conveyed fluid amount at sufficient accuracy, the level of energy demand, in contrast, for example, to values calculated from purely theoretical nominal values of the compressors, can reflect the actual energetic utilization in the running operation in a relatively precise manner.

In doing so, it can be taken into account in the control that for compressors or groups of compressors which due to past energetically unfavorable load cycles exhibit a correspondingly lower energetic utilization and probably are untruly long classified in the selection of the aggregates to be switched on load as being low-level (positive feedback), the level of energy demand is successively adapted to current energetic utilization characteristics of the compressor system by a compensation mechanism.

In this case, it should also be noted that, when switching to load, typically compressors which are at no-load and have a comparatively large remaining no-load power, are preferred to compressors which have a comparatively smaller remaining no-load work or the motor of which is already switched off in order to save energy by avoiding no-load work loss and startup work. Moreover, when switching from load, typically those among compressors of equal or similar size are preferred which have an expected small no-load work loss in order to thus save energy by avoiding no-load work.

The pressure-technological effect of the individual compressors on the control is described in the form of a pressure compensation degree of the compressors as an adaptive parameter and can be determined via the pressure compensating effect of switching operations by averaging over an appropriate number of single events. In this case, the pressure compensating effect of the switching operations can be taken from the chronological pressure variation.

Since in the selecting of compressors to be switched, preferably only compressors or groups are taken into account the pressure compensating effect (sum of the pressure compensation degrees) of which is adapted to the current operating state (current pressure profile) of the compressor system, the switching of the selected compressors typically induces the desired pressure profile to be established in time so that in practice additional, energetically disadvantageous switching operations are not required.

In operating states which are characterized by a rapid change in the pressurized fluid reduction, compressors can be selected under defined conditions, the pressure compensating effect of which cannot completely compensate the real pressure profile in terms of a reversal of the pressure direction, which constitutes an undercompensation of the real pressure profile at the switching time. In such cases, the control can therefore advance the switching time by a time span which is adapted to the extent of the undercompensation. In accordance with the embodiment, a time buffer is provided so as to switch further compressors in time, if needed, whereby it can be achieved that no further compressors at best need to be switched or that, after a switch-on operation, the pressure can at least be stabilized on an energetically favorable level for a relatively longer period of time.

Moreover, it can happen in very rare cases that the adaptation pressure is inadmissibly undercut under conditions of strong fluctuations of pressurized fluid being withdrawn from the compressor system. In such situations, the control can counteract the deviation of the real pressure profile from the adaptation pressure as required immediately and situation-adapted by immediately switching one or more additional compressors to load. Still during the running switch-on operation, i.e. before the pressure compensating effect of the switched-on compressors has started, it can be checked on the basis of the real pressure profile whether the future pressure compensating effect is expected to be sufficient to establish a desired real pressure profile. If the future pressure compensating effect is determined to be sufficient, no further compressor will be switched to load. Otherwise, one or more compressors are immediately switched to load.

In an alternative embodiment of the method according to the invention, the experiential parameters can comprise: the pressure compensation degree of a compressor depending on the storage volume and the installation scheme of the pressurized fluid system and/or the level of energy demand of a compressor depending on its previous mode of operation, environmental temperature, maintenance, wear and contaminating states and/or the switch-on response time and pressure compensation degree of a compressor depending on typical patterns of the change of withdrawal of pressurized fluid. Accordingly, the control can also adaptively learn not purely compressor-specific characteristics but also in part characteristics which result from the interaction of compressors and the operating state or the respective environment of use.

In a further preferred embodiment of the method according to the invention, same is characterized in that a switching on of compressors or a combination of compressors is performed early enough so that in consideration of the startup behavior of the compressor or the compressor combination, optionally in consideration of the preferably adaptively learnt switch-on response times, the real pressure profile reaches the adaptation pressure as precisely as possible, preferably at a deviation of less than 5%, further preferred less than 2%, and further preferred does not or only insignificantly and/or shortly fall below same. Accordingly, the real pressure profile reaches in its minimum pressure values within relatively narrow limits the virtually determined adaptation pressure as precisely as possible.

A further embodiment of the method according to the invention can provide for preferably selecting such compressors or combinations of compressors in the determining of switching alternatives of compressors to be switched to load, which have favorable values of experiential parameters for the level of energy demand. Accordingly, an energy-saving operation as possible of the compressor system is guaranteed.

In another embodiment of the method for controlling a compressor system, preferably such compressors are selected in the determining of switching alternatives of compressors to be switched to load which are at no-load or still have a long remaining no-load running time or remaining no-load work, and/or such compressors are preferably selected as compressors to be switched to no-load or stopped status which have a low no-load running time or no-load work loss. Accordingly, the total work loss as a sum of all work losses is also reduced since a reducing of the no-load power is taken into account in the determining of the switching alternative to be selected in term of energetic optimization.

Another preferred embodiment of the method according to the invention provides for the determining of switching alternatives and/or the determining of a switch-off pressure and/or the determining of a switch-on pressure to be performed assuming a constant pressurized fluid reduction. In this case, the assumption of a constant pressurized fluid reduction is only reasonably performed for the determining of the respective next switch-on or switch-off pressure. For the subsequent determining of a future and following switch-on or switch-off pressure, a new, in turn constant value for the pressurized fluid reduction is taken as a basis, as need be. This assumption of a constant pressurized fluid reduction allows the real pressure profile during a switching cycle including the next switch-on operation to be calculated using mathematically simple to handle expressions in terms of energy. Consequently, en energetic optimum or a maximum efficiency related to the operation of the compressor system can also be calculated for the period of a switching cycle.

In a further embodiment of the method according to the invention, the determining of a current value of the withdrawal of pressurized fluid is either determined by a measuring device and/or calculated from the past real pressure profile, the operating state of the compressors and/or the possible adaptively learnt accumulator size of the compressor system.

In a further embodiment of the method according to the invention, same is characterized in that, under predefined conditions, the switch-on or switch-off commands to be triggered upon reaching the switch-on pressure or switch-off pressure can be suppressed and/or additional switch-on commands or switch-off commands triggered independent of the reaching the switch-on pressure or switch-off pressure. Additional switch-off commands can thus be triggered, for instance, upon approaching the upper pressure limit so as to prevent the real pressure profile from exceeding the upper pressure limit. Moreover, a determined switch-on command can be suppressed upon a distinct and lasting positive curvature of the decreasing pressure profile due to a reducing withdrawal of pressurized fluid from the pressurized fluid system so as to be able to better estimate the further real pressure profile. Accordingly, switch-off commands can also be suppressed upon a distinct and lasting negative curvature of an increasing real pressure profile which results from increasing pressurized fluid being withdrawn. Here as well, the switching alternative selected by the control for performing an improved energetic calculation is initially suppressed so as to be able to better estimate the further pressure profile and consequently to perform an improved future switching operation with respect to the energy consumption.

When in another, likewise preferred embodiment of the method according to the invention, a plurality of switching alternatives are determined as being energetically equivalent further criteria, such as the number of operating hours of a compressor in question, same are additionally taken into account. Accordingly, it can be guaranteed that the number of operating hours of different compressors comprised by the compressor system is mostly uniform, whereby maintenance-contingent or use-contingent outages of single compressors can be reduced to a predetermined extent.

In accordance with a further embodiment of the method according to the invention, the determined switching off is only released by the control when it is ensured that a possibly necessary switch-on operation can be performed in time in consideration of the startup behavior of a possible switching combination. Such a considering of the startup behavior of a compressor or a combination of compressors of the compressor system allows for a predefined overpressure to be always maintained in the pressurized fluid system. An unforeseen and in the normal case energetically unfavorable switching on of further compressors or compressor groups due to the releasing of a determined switching operation which cannot be implemented in time, can thus be avoided.

Further embodiments of the invention result from the subclaims.

The invention will be described in more detail below on the basis of exemplary embodiments which will be explained by means of the figures.

Figure 3:
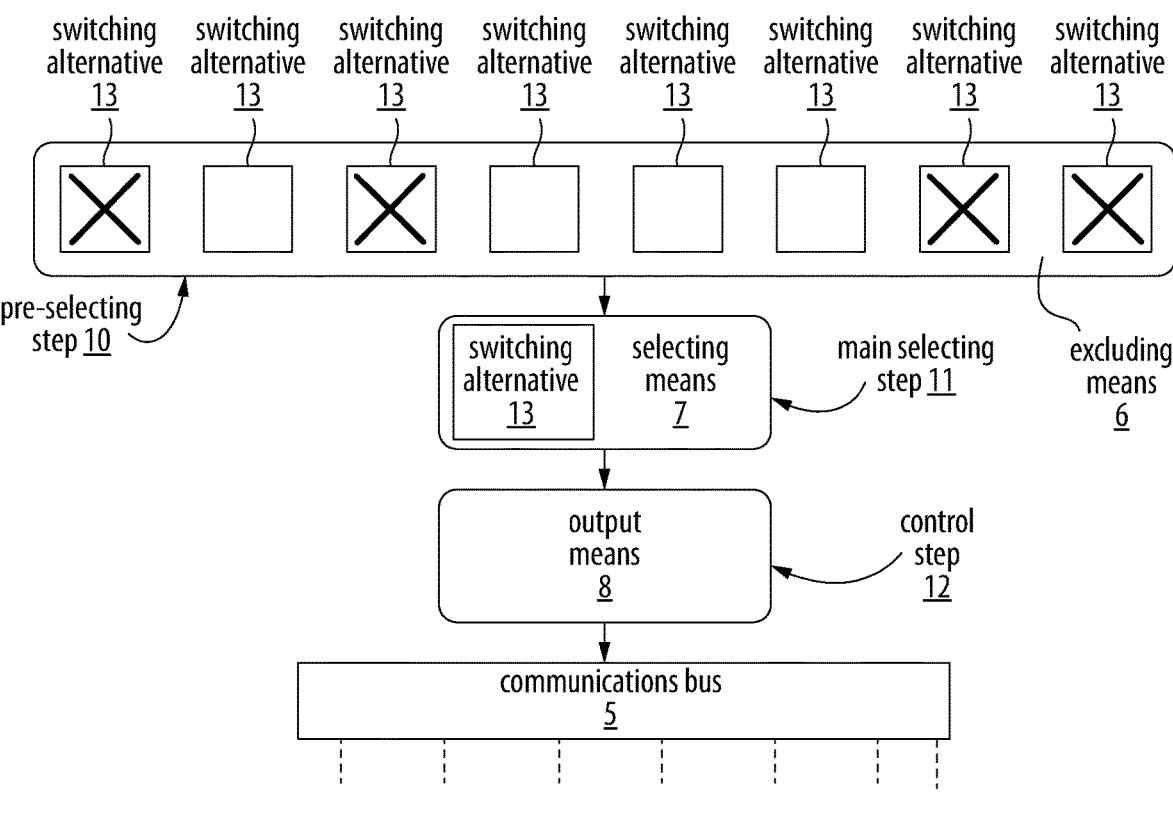
Figure 4:
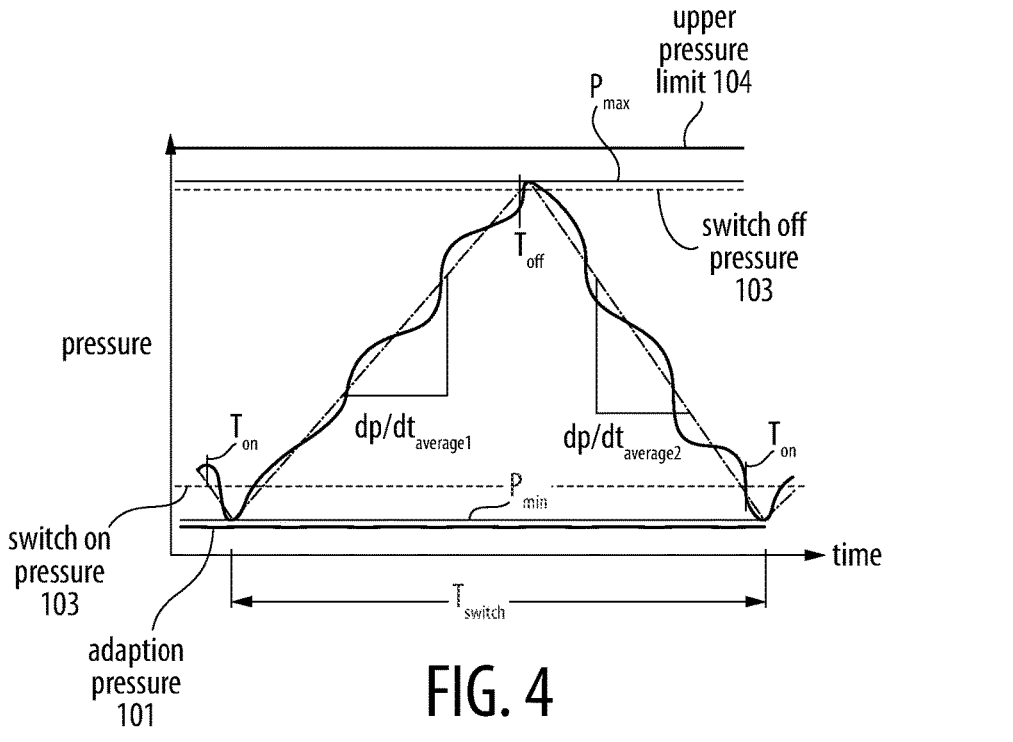

Shown are in:

FIG. 1 a schematic representation of a compressor system comprising a plurality of compressors;

FIG. 2 a schematic representation of one embodiment of the control means according to the invention for controlling the compressor system shown in FIG. 1;

FIG. 3 a schematic representation of one embodiment of the control according to the invention in a flowchart representation;

FIG. 4 a representation of a real pressure profile in a compressor system indicating specific control parameters according to one embodiment of the control method according to the invention.

FIG. 1 shows a schematic representation of a compressor system 1 which comprises six compressors 2 in total each connected to a communications bus 5. Via appropriate pressure lines, each of the compressors 1 is connected to processing elements 21 which can be realized as dryers or filters, for example. The six compressors 2 fluidically supply a central pressurized fluid reservoir 3 which additionally has a measuring means 20 which is communicatively coupled to the communications bus 5. The measuring means 20 allows in this case, for example, the pressure state within the pressurized fluid reservoir 3 to be measured continuously and is capable of forwarding measured parameters to the control of the compressor system 1 via the communications bus 5 which are available in the control method 41 (presently not shown) in terms of control engineering.

The pressurized fluid supplied by the compressors 2 in the pressurized fluid reservoir 3 is forwarded to a user for withdrawal of pressurized fluid via an appropriate pressure line which can alternatively comprise further functional elements 22 (in the present case e.g. a control valve). The control or regulating of the overpressure maintained within the pressurized fluid reservoir 3 is performed by means of a central control means 4 which is presently not shown but is communicatively coupled to the communications bus. In this case, the communication between the compressors 2 and the communications bus 5 can take place via conventional wired signal lines or else via wireless communication paths.

In accordance with the embodiment, the selected communication protocol can ensure the control method explained below in more detail to be executed in real-time. The pressure prevailing within the pressurized fluid reservoir 3 is detected by the measuring means 20 preferably likewise in real-time. Practically, a sampling in time intervals of less than one second, preferably less than a tenth of a second is suitable for this purpose. In typical pressurized fluid applications, the measuring means 20 will measure an overpressure within the pressure reservoir 3. In also possible vacuum applications, the measuring means 20 will measure, as described above, a corresponding negative pressure which can likewise be provided in the pressurized fluid reservoir 3. As will be clear to the skilled person, the compressors 2 are for this purpose replaced by appropriate vacuum pumps. The pressure value detected by the measuring means 20 can be more or less smoothed, evaluated on an absolute or time-differential or combinatory basis depending on the purpose of use, in order to being introduced in the control or regulating method. The thus conditioned pressure value can be used inter alia for calculating an energetically optimum switch-off pressure 103 (presently not shown), for calculating a pressure compensation degree of the compressors, and for calculating the compressors' switch-on response times at stopped status or in the no-load state.

Moreover, a further measuring means can be provided supportingly which is likewise connected to the central control means and ascertains the measured pressurized fluid consumption, respectively the withdrawal of pressurized fluid in order to determine e.g. switch-on response times with higher accuracy.

The compressors' operating data exchanged with the central control means via the communications bus 5 inter alia concern the current operating state of each compressor. This information is required by the controlling or regulating method among other things for selecting the compressors to be switched to load. Furthermore, this information comprise the motor speed based on which the control method can ascertain the energy consumption of a compressor or a compressor group. Same can further include information on compressor-internal pressure sensors for assessing after-running times, when the compressor e.g. is at no-load running, respectively expected after-running times, when the compressor is at load running, as well as information on whether the compressor is in load operation at all or not. Alternatively, some or all of the mentioned operating data of the compressors can also be remodeled or approximated by way of data processing so that same do not need to be exchanged via the communications bus 5 and are all the same available to the central control means in sufficient approximation.

For application-technological reasons, the compressor system 1 can moreover comprise editing elements 21 which give cause to a characteristic change of the system-internal fluid pressures. The influence of the editing elements 21 within the compressor system 1, however, can be appropriately compensated for by a suitable adaptive learning behavior of the control or regulation. An increasing time delay in the pressurized fluid conveying between a compressor and the central pressurized fluid reservoir due to a filter being increasingly contaminated, in the form of an increasing switch-on response time of the compressor from the off-state as well as the no-load running state can, for instance, be adaptively compensated. Such an increasing switch-on response time can be simply compensated by the control so that the increasing filter contamination does not affect the maintaining of the predefined overpressure within the pressurized fluid reservoir 3.

Based on application-technological considerations, the compressor system 1 can moreover comprise one or more pressure regulating valves for pressure stabilization.

FIG. 2 shows a schematic representation of the control method of control means 4. The control means 4 is in this case in communicative contact with the communications bus 5 and can both read in and out data. The control means 4 can optionally transmit switching commands to single compressors 2 via the communications bus 5. For the feeding of control parameters, respectively inputting of data for characterizing the compressors 2, the control means 4 includes a feeding interface 40. Said data is transmitted to the control method 41 which can be implemented as a software application in terms of an adaptive control method. The control method 41 generates suitable control commands, respectively switching commands for controlling the compressors 2 which are transmitted to the compressors 2 via the communications bus 5. The control method 41 includes a control algorithm 42 for this purpose which optimizes the energy demand of the compressor system within a pressure tolerance range between adaptation pressure 101 and upper pressure limit 104. It is to be noted here that the control algorithm 42 can also be understood as a regulating algorithm. The control means 4 comprises further a presently not shown system clock having an appropriate timer which is capable of provide an appropriate timing to the control method 41.

In accordance with the embodiment, the control algorithm 42 permits an energy-guided adaptive regulating and assesses a switch-off pressure 103 for the compressors to be switched off load within the available pressure tolerance range in an energetically targeted manner. For this purpose, the control algorithm 42 calculates the energetically optimum switch-off pressure 103 in a mathematically analytical form. This optimum switch-off pressure 103 is defined in accordance with the embodiment by the minimum value of a function which describes the total power loss of all of the compressors 2 of the compressor system 1 during one switching cycle depending on the switch-off pressure 103. In accordance with the embodiment, then assumption enters here into the calculation that the withdrawal of pressurized fluid remains on average constant and that the switching cycle therefore repeats uniformly between two successive minimum, respectively maximum pressure values. The assumption of a pressure fluid withdrawal being on average constant allows for pressure profile fluctuations to be taken into account in the real pressure profile as well.

In doing so, the energy-guided control algorithm 42 makes use of present regulation-technological degrees of freedom in that these degrees of freedom are not occupied or limited by fixedly predetermined control parameters or else a too small or strictly predetermined pressure regulating range, but optimizes same with respect to energy. Both the selecting of the compressors 2 to be switched and the points in time, respectively pressures for the switching operations to be implemented are not parameterized but are calculated by the control method 41 on a case-by-case basis in en energetically optimized manner.

Apart from the energy-guiding of the control method 41, same is also characterized by an adaptive behavior with respect to adapting adaptive parameters during running operation. In doing so, the adaptive behavior supports the optimizing of the energy demand of compressor system 1 decisively. The adaptive behavior is based on an adaptation algorithm 43 comprised by the control method 41 which adjusts all adaptive parameters during the compressor system's operation and makes them available to the control algorithm 42. The adaptive behavior also allows the selecting of the compressors to be switched to being automatically adapted to regulation-relevant, fixed and variable characteristics respectively conditions of the compressor system as well as the use thereof in the running operation. Examples of such adaptive parameters can be the energy demand per conveyed fluid amount of a compressor 2, as well as the pressure-technologically active storage volume of the pressurized fluid system and the temporal switching behavior of the compressors 2.

FIG. 3 shows a schematic representation of the sequence of single steps in accordance with one embodiment of the inventive method for controlling a compressor system 1 in a flowchart representation. In this case, determined switching alternatives 13 are excluded in a pre-selecting step 10 in an excluding means 6 of a control means 4 not shown in greater detail from the multitude of combinatorially available switching alternatives 13, preferably while taking into account the current conditions. The pre-selecting e.g. can be performed on the basis of selection criteria taking into account the technical feasibility of the predetermined switching alternative 13. In the present case, for instance, eight combinatorially possible switching alternatives 13 are available in total, from which four switching alternatives 13 (deselected by crossing out) have shown to be inappropriate for the present operating conditions and hence are deselected in advance. From the remaining four switching alternatives 13, one switching alternative 13 is selected in a main selecting step 11 in a selecting means 7 of the control means 4 not shown in greater detail while referring to one or more optimizing criteria by weighing up all of the switching alternatives 13 against one another which had not been deselected in the pre-selecting step 10. The selected switching alternative 13 assessed in the main selecting step 11 is output in a control step in an output means 8 of the control means 4 not shown in greater detail for being implemented in the compressor system 1. In the present case, the outputting has been illustrated symbolically as a forwarding of information from the output means 8 to the communications bus 5 which, however, should not be understood here as being limiting.

FIG. 4 shows a representation of the real pressure profile 105 in the pressurized fluid system during a periodic time interval $T_{switch}$. The length of the periodic time interval $T_{switch}$ here is related to just the length of one switching cycle. In accordance with one embodiment of the inventive control method, the control assesses an individual switch-off pressure 103 for the compressor 2 to be switched from load within the available pressure tolerance range according to principles of energetic optimization. The pressure tolerance range is in this case the pressure range between an adaptation pressure 103 not to be undercut and an upper pressure limit 104 not to be exceeded. In accordance with the embodiment, the energetically optimum switching cycle pressure difference and the energetically optimum switch-off pressure 103 for the compressors 2 to be switched to load is mathematically-analytically calculated as an energetic optimum. For this calculation will be assumed that the withdrawal of pressurized fluid is on average constant. The pressure drop can consequently be represented as a rise of a linearly falling straight line which approximately describes the real pressure profile. Analogously, the increase of pressurized fluid within the pressurized fluid system can be described by a largely similar mathematical averaging of the really rising pressure profile as a monotonously rising straight line.

Under these presuppositions of on average constant withdrawal of pressurized fluid, the switching cycle including the next switch-on operation can be energetically described by a simple mathematical representation. Due to this simple mathematical representation it is possible to calculate the energetic optimum respectively the maximum efficiency of the compressor system during such a switching cycle. For this purpose, the control method 41 regulates the switch-off pressure 103 of the compressors 2 to be switched such that the entire total power loss depending on the switching cycle (total work loss per periodic time interval $T_{switch}$) becomes minimal.

Both the load-running as well as the switching and idle running compressors 2 contribute to this power loss depending on the switching cycle. The energy demand of the load-running compressors (load work) increases with the switching cycle pressure difference since the internal working pressure difference thereof increases on average. In contrast hereto, the switching work loss as well as the no-load work loss of the compressors to be switched decreases with an increasing switching cycle pressure difference since the number (frequency9 of switching cycles decreases. The sum of loss components in an energetic optimization occupies a minimum in the calculated switching cycle pressure difference. The expression to be minimized result in accordance with the following equation (1):

$$P_V = \left(\Delta W_{load} + \Delta W_{no-load} + \Delta W_{switch}\right) / T_{switch} \tag{1}$$

In this case, $\Delta W_{load}$ is the work loss of the load-running compressors per switching cycle due to the pressure elevation as compared to the switch-on pressure, $\Delta W_{no-load}$ is the no-load work loss of the compressors to be switcher per switching cycle due to the no-load performances and after-running time thereof, $\Delta W_{switch}$ is the switching work loss per switching cycle of the compressors 2 to be switched due to the slow internal pressure compensation process during switching in no-load running, probably of a motor restart, and the internal pressure adaptation when switching to load, $T_{switch}$ is the duration of a switching cycle which temporally extends over a periodic pressure increase and the subsequent pressure drop.

The individual components of the total work loss are in this case calculated in accordance with equation (2):

$$\Delta W_{load} = \tag{2}$$

$$0.5 \cdot r_{load} \cdot \Delta p_{switch}^2 \cdot \left(P_{load1} / ldp / dtl_{average1} + P_{load2} / ldp / dtl_{average2}\right)$$

In this case, $r_{load}$ is the relative increase of the load performance of load-running compressor 2 per pressure unit, $\Delta p_{switch}$ is the switching cycle difference, $P_{load1}$ is the load performance of the compressors, the compressors 2 to be switched included, which are load-running toward the switch-off pressure 103 in the course of the pressure profile at the switch-on pressure 102, $Idp/dtl_{average1}$ is the amount of the expected average pressure increase during the real pressure profile toward the switch-off pressure 103, calculated on the basis of a commensurate period of time, $P_{load2}$ is the load performance of the compressors, the compressors 2 to be switched excluded, which are load-running toward the switch-off pressure 103 in the course of the pressure profile at the switch-on pressure 102, $Idp/dtl_{average2}$ is the amount of the expected average pressure increase during the pressure profile toward the switch-on pressure 102 from $Idp/dtl_{average1}$ and the pressure compensating effect of the compressors 2 to be switched.

The no-load work loss $\Delta W_{no-load}$ is calculated on the basis of the following equation (3):

$$\Delta W_{no-load} = \Sigma\left(P_{no-load} \cdot T_{no-load}\right) \tag{3}$$

In this case, P no-load is the no-load performance of the individual compressors to be switched, and $T_{no-load}$, the after-running time at no-load of the individual compressors to be switched, is restricted to a time between the switching on and off.

The switching work loss $\Delta W_{switch}$ is calculated as a sum of the switching work losses $W_{switch}$ per switching cycle of the compressors 2 to be switched in accordance with the following equation (4):

$$\Delta W_{switch} = \Sigma W_{switch} \tag{4}$$

Furthermore, the periodic time interval $T_{switch}$ of a switching cycle can be easily calculated in accordance with equation (5) based on the following correlation which results from simple geometric considerations as per FIG. 4:

$$T_{switch} = \Delta p_{switch} \cdot (1 / dtl_{average1} + 1 / ldt / dtl_{average2}) \tag{5}$$

The calculation of the energetically optimum switching cycle pressure difference $\Delta p_{switch,opt}$ can be calculated using equation 81) by simply inserting the terms for the individual work losses $\Delta W_{load}$, $\Delta W_{no-load}$, $\Delta W_{switch}$ as well as the length of the periodic time interval (switching cycle duration) $T_{switch}$ into the formula as per equation 1 for the power loss $P_V$ which depends on the switching cycle, by subsequently deriving according to the switching cycle pressure difference $\Delta p_{switch}$ and correspondingly zero-setting of the derivation. Consequently, the energetically optimum switching cycle pressure difference $\Delta p_{switch,opt}$ can be represented as a mathematically easy to handle expression in accordance with equation (6):

$$\Delta p_{switch,opt} = \sqrt{\{[\Sigma P_{no-load} \cdot T_{no-load}) + \Sigma W_{switch}] / [0.5 \cdot} \tag{6}$$
$$r_{load} \cdot (P_{load1} / ld p / dtl_{average1} + P_{load2} / ld p / dtl_{average2})]\}}$$

The energetically optimum switch-off pressure in applications of pressurized fluid results as a sum of the adaptation pressure 101 and the calculated energetically optimum switching cycle pressure difference $\Delta p_{switch,opt}$. In corresponding vacuum applications, for example, the energetically optimum switch-off pressure 103 results as the difference of the two previously mentioned values as will be clear to the person skilled in the art.

It should moreover be pointed out that the control method in accordance with the embodiment takes into account the delay times of the individual compressors 2 or combinations of compressors 2 which are determined from the times between the switching on or off of a compressor 2 and the points of time of the actual implementation of the change of state. Accordingly, the switch-on times $T_{on}$ just as the switch-off times $T_{off}$ are temporally advanced in comparison to the minimum pressure values of the real pressure profile 105 respectively the maximum pressure values.

Furthermore, FIG. 4 shows a partly idealized switching cycle for illustrative purposes. An upper pressure limit 104 is defined by system-contingency, e.g. by the components' pressure resistance. The lowermost line in the diagram represents the adaptation pressure 101 which already had been discussed several times. The pressure profile in the switching cycle illustrated here moves between a (local) minimum value $P_{min}$ and a (local) maximum value $P_{max}$. At a point of time $T_{AB}$, namely upon reaching the switch-off pressure 103 at a rising pressure profile, measures are taken for reducing the generating of compressed pressurized fluid, which have the effect that the pressure shortly rises above the switch-off pressure 103 to the (local) maximum value $P_{max}$ but then the pressure increase reverses into a pressure drop. Once the switch-on pressure 102 is reached at a falling pressure profile, measures are taken for increasing the generating of compressed pressurized fluid so that the pressure further decreases to a (local) minimum value $P_{min}$ but the pressure drop then reverses into a new pressure increase.

It is to be noted at this point that all of the above described components, whether alone or in any combination, are claimed as being essential to the invention, optionally the details depicted in the drawings. Variations thereof will be familiar to those skilled in the art.

LIST OF REFERENCE NUMERALS 1 compressor system
2 compressor
3 pressurized fluid reservoir
4 control means
5 communications bus
6 excluding means
7 selecting means
8 output means
9 switch-off pressure determining means
10 pre-selecting step
11 main selecting step
12 control step
13 switching alternative
20 measuring means
21 processing element
22 functional element
30 data record
40 feeding interface
41 control method
42 control algorithm
43 adaptation algorithm
101 adaptation pressure
102 switch-on pressure
103 switch-off pressure
104 upper pressure limit
105 real pressure profile
$T_{on}$ switch-on time
$T_{off}$ switch-off time

The invention claimed is:

1. A method for controlling a compressor system, the method comprising:

determining in real-time during operation of the compressor system a variable switch-off pressure for the compressor system, the determining of the variable switch-off pressure comprising basing the variable switch-off pressure on a minimum value of a function that determines a total power loss of a plurality of compressors in the compressor system during one switching cycle as a function of switch-off pressure; and adapting the compressor system to current conditions by:

identifying a plurality of switching alternatives for the plurality of compressors, each switching alternative comprising a defined change in a configuration of the compressor system;

pre-selecting a smaller number of switching alternatives from the plurality of switching alternatives;

selecting a given switching alternative from the smaller number of switching alternatives;

increasing generation of a compressed pressurized fluid by the compressor system using the given switching alternative when a prevailing pressure of the pressurized fluid in the compressor system reaches a switch-on pressure, the switch-on pressure greater than an adaptation pressure that should not be undercut by the prevailing pressure; and reducing generation of the pressurized fluid by the compressor system using the given switching alternative when the prevailing pressure of the pressurized fluid in the compressor system reaches the determined variable switch-off pressure, the variable switch-off pressure and the adaptation pressure defining a varying pressure band, the prevailing pressure moving along a pressure profile from at least the variable switch-off pressure and a minimum pressure between the switch-on pressure and the adaptation pressure during each switching cycle between two points at which the prevailing pressure equals the switch-on pressure.

2. The method of claim 1, wherein the plurality of compressors comprises compressors having different designs, different performance characteristics, or different designs and different performance characteristics.

3. The method of claim 1, wherein the method further comprises changing the determined variable switch-off pressure as a function of at least one of a current configuration of the compressor system and a switching operation.

4. The method of claim 3, wherein the current configuration of the compressor system comprises a current operation of the compressors in the plurality of compressors, and the switching operation comprises a change in the operation of one of more compressors in the plurality of compressors.

5. The method of claim 1, wherein determining the variable shut-off pressure comprises determining the variable shut-off pressure such that a real pressure profile in the compressor system does not exceed an upper pressure limit to assure compliance with pressure resistance limits of components within the compressor system.

6. The method of claim 1, wherein reducing generation of the pressurized fluid comprises executing a switching operation that changes a configuration of the compressor system.

7. The method of claim 6, wherein executing the switching operation comprises switching a load state of one or more compressors in the plurality of compressors.

8. The method of claim 7, wherein switching a load state of one or more compressors comprises switching one or more compressors to a no-load running state, changing an output of one or more compressors to a lower value, stopping one or more compressors, or combinations thereof.

9. The method of claim 6, wherein executing the switching operation comprises executing a switching operation immediately upon determination that the prevailing pressure of the pressurized fluid in the compressor system has reached the determined variable switch-off pressure.

10. The method of claim 1, wherein:

reducing generation of the pressurized fluid further comprises:

identifying a plurality of switching alternatives, each switching alternative comprising an associated switching operation; and selecting one of the switching alternatives; and executing the switching operation associated with the selected switching alternative.

11. The method of claim 10, wherein selecting one of the switching alternatives comprises selecting one of the switching alternatives in real time during operation of the compressor system.

12. The method of claim 10, wherein selecting one of the switching alternatives comprises using current operating conditions of the compressor system to select one of the switching alternatives.

13. The method of claim 10, wherein:

reducing generation of the pressurized fluid further comprises removing one or more switching alternatives from the identified plurality of switching alternatives; and selecting one of the switching alternatives comprises selecting one of the switching alternatives from switching alternatives remaining in the identified plurality of switching alternatives.

14. The method of claim 13, wherein removing one or more switching alternatives comprises:

determining switching alternatives in the identified plurality of switching alternatives whose implementation is not technically feasibly based on current operating conditions in the compressor system; and removing switching alternatives determined to be not technically feasible.

15. The method of claim 1, wherein reducing generation of the pressurized fluid by the compressor system comprises reducing generation of the pressurized fluid immediately upon determination that the prevailing pressure of the pressurized fluid in the compressor system has reached the determined variable switch-off pressure.

16. The method of claim 1, wherein the defined change in the compressor system configuration comprises a given change of the compressors in the compressor system among load running status, no load running status, and stopped status.

17. The method of claim 1, wherein the function is based on a load-running work loss in relation to a switching cycle duration.

18. The method of claim 17, wherein the function is further based on a no-load running work loss in relation to the switching cycle duration.

19. The method of claim 18, wherein the function is further based on a switching loss energy in relation to the switching cycle duration.

* * * * *